United States Patent
Qiu et al.

(10) Patent No.: US 10,255,228 B2
(45) Date of Patent: Apr. 9, 2019

(54) SYSTEM AND METHOD FOR PERFORMING SHAPED MEMORY ACCESS OPERATIONS

(75) Inventors: Xiaogang Qiu, San Jose, CA (US); Jack Hilaire Choquette, Palo Alto, CA (US); Manuel Olivier Gautho, Los Gatos, CA (US); Ming Y. (Michael) Siu, Santa Clara, CA (US)

(73) Assignee: NVIDIA CORPORATION, Santa Clara, CA (US)

(*) Notice: Subject to any disclaimer, the term of this patent is extended or adjusted under 35 U.S.C. 154(b) by 1641 days.

(21) Appl. No.: 13/312,954

(22) Filed: Dec. 6, 2011

(65) Prior Publication Data

US 2013/0145124 A1 Jun. 6, 2013

(51) Int. Cl.
G06F 9/30 (2018.01)
G06F 15/167 (2006.01)
G06F 9/38 (2018.01)
G06F 9/345 (2018.01)

(52) U.S. Cl.
CPC .......... *G06F 15/167* (2013.01); *G06F 9/3012* (2013.01); *G06F 9/3455* (2013.01); *G06F 9/383* (2013.01); *G06F 9/3851* (2013.01); *G06F 9/3887* (2013.01)

(58) Field of Classification Search
None
See application file for complete search history.

(56) References Cited

U.S. PATENT DOCUMENTS

| 5,513,366 A | 4/1996 | Agarwal et al. |
| 2006/0149937 A1 | 7/2006 | Jiang et al. |

FOREIGN PATENT DOCUMENTS

| CN | 101231585 A | 7/2008 |
| TW | 200634622 | 10/2006 |
| TW | I300187 | 8/2008 |
| WO | 2006071947 A1 | 7/2006 |
| WO | 2011038411 A | 3/2011 |

OTHER PUBLICATIONS

Fung et al.; Dynamic Warp Formation: Efficient MIMD Control Flow on SIMD Graphics Hardware; ACM; Jun. 2009.*

* cited by examiner

*Primary Examiner* — Corey S Faherty
(74) *Attorney, Agent, or Firm* — Artegis Law Group, LLP

(57) ABSTRACT

One embodiment of the present invention sets forth a technique that provides an efficient way to retrieve operands from a register file. Specifically, the instruction dispatch unit receives one or more instructions, each of which includes one or more operands. Collectively, the operands are organized into one or more operand groups from which a shaped access may be formed. The operands are retrieved from the register file and stored in a collector. Once all operands are read and collected in the collector, the instruction dispatch unit transmits the instructions and corresponding operands to functional units within the streaming multiprocessor for execution. One advantage of the present invention is that multiple operands are retrieved from the register file in a single register access operation without resource conflict. Performance in retrieving operands from the register file is improved by forming shaped accesses that efficiently retrieve operands exhibiting recognized memory access patterns.

7 Claims, 11 Drawing Sheets

Figure 4D

SYSTEM AND METHOD FOR PERFORMING SHAPED MEMORY ACCESS OPERATIONS

BACKGROUND OF THE INVENTION

Field of the Invention

The present invention generally relates to computer architectures and, more specifically, to a system and method for operand collection in a register file.

Description of the Related Art

A common practice in parallel processing systems is to design a processor that executes multiple threads simultaneously. When such threads all execute the same instruction sequence (typically with different data for each thread), there are tangible benefits to sharing certain resources among the threads. For example, each thread may execute an instruction that accesses one or more operands to be retrieved from a shared bank of register files, where each thread accesses a different register address within the bank of register files. This type of operation may be found on single instruction multi-thread (SIMT) and single instruction multi-data (SIMD) processors.

During operation, the processor may execute an instruction across multiple threads, where the instruction accesses one or more operands from the bank of register files, and the operands are located at different register addresses within the bank of register files. The processor then performs a register access operation to retrieve the operands. For example, if four threads simultaneously execute an instruction requiring three operands each, then the processor retrieves up to twelve separate operands in order to execute the instruction. Performance is greatly improved when all twelve operands can be retrieved within the same register access operation.

Due to various constraints, such as physical memory configurations, certain combinations of registers may not be simultaneously accessible. When two or more operands are located in register file locations that may not be accessed at the same time, the processor encounters a register bank conflict. In such a case, the processor is not able to retrieve all operands in a single register access operation.

One approach to avoiding register file conflicts is to perform serially a separate register access operation for each operand accessed by the current instruction. This approach avoids register bank conflicts because each operand is accessed one at a time. However, one drawback of this approach is that the processor is not able to retrieve multiple operands using the same register access operation to access operands that do not cause a register bank conflict. For example, if four threads are executing an instruction requiring three operands, then the processor would perform twelve separate register access operations in order to avoid register bank conflicts. However, the distribution of the operands throughout the bank of register files could be such that the processor could retrieve all operands in less than twelve register access operations. In such situations, potential efficiencies are associated with memory access operations are not realized.

As the foregoing illustrates, what is needed in the art is a more efficient way to collect operands from a register file.

SUMMARY OF THE INVENTION

One embodiment of the present invention sets forth a computer-implemented method for performing register memory operations. An instruction dispatch unit receives an instruction that is to be executed across a plurality of operands. The instruction dispatch unit recognizes that a plurality of register files in which the plurality of operands is stored is accessible via a particular memory access pattern. Next, the instruction dispatch unit forms a shaped memory access operation corresponding to the particular memory access pattern. The instruction dispatch unit then performs the shaped memory access operation to access the plurality of operands from the plurality of register files.

One advantage of the disclosed technique is that multiple operands are retrieved from the register file in a single register access operation without resource conflict.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4D illustrates a bank of register files configured for operand collection, according to yet another alternative embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
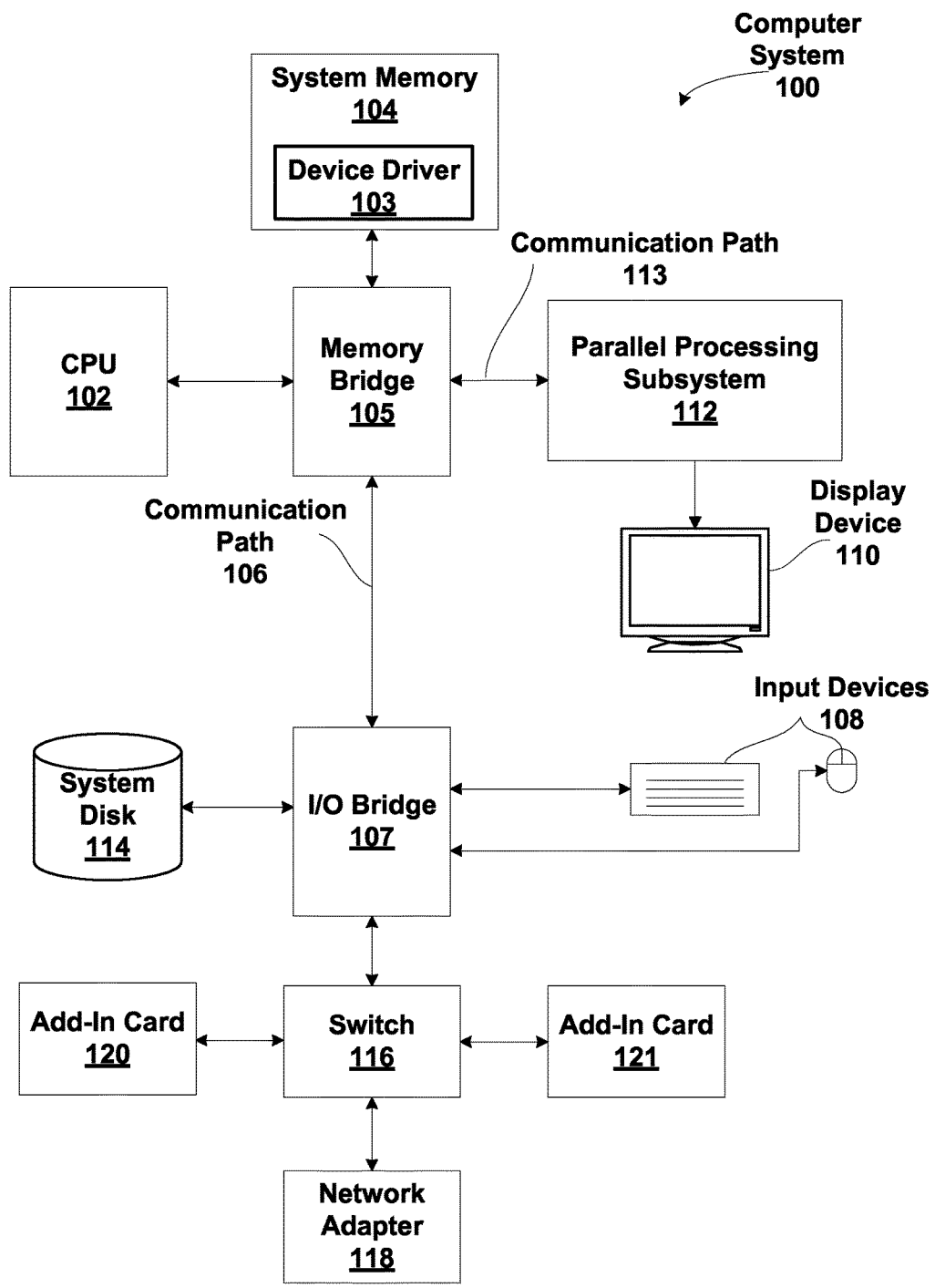
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 (e.g., a conventional cathode ray tube or liquid crystal display based monitor). A system disk 114 is also connected to I/O bridge 107. A switch 116 provides connections between I/O bridge 107 and other components such as a network adapter 118 and various add-in cards 120 and 121. Other components (not explicitly shown), including universal serial bus (USB) or other port connections, compact disc (CD) drives, digital video disc (DVD) drives, film recording devices, and the like, may also be connected to I/O bridge 107. The various communication paths shown in FIG. 1, including the specifically named communication paths 106 and 113, may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
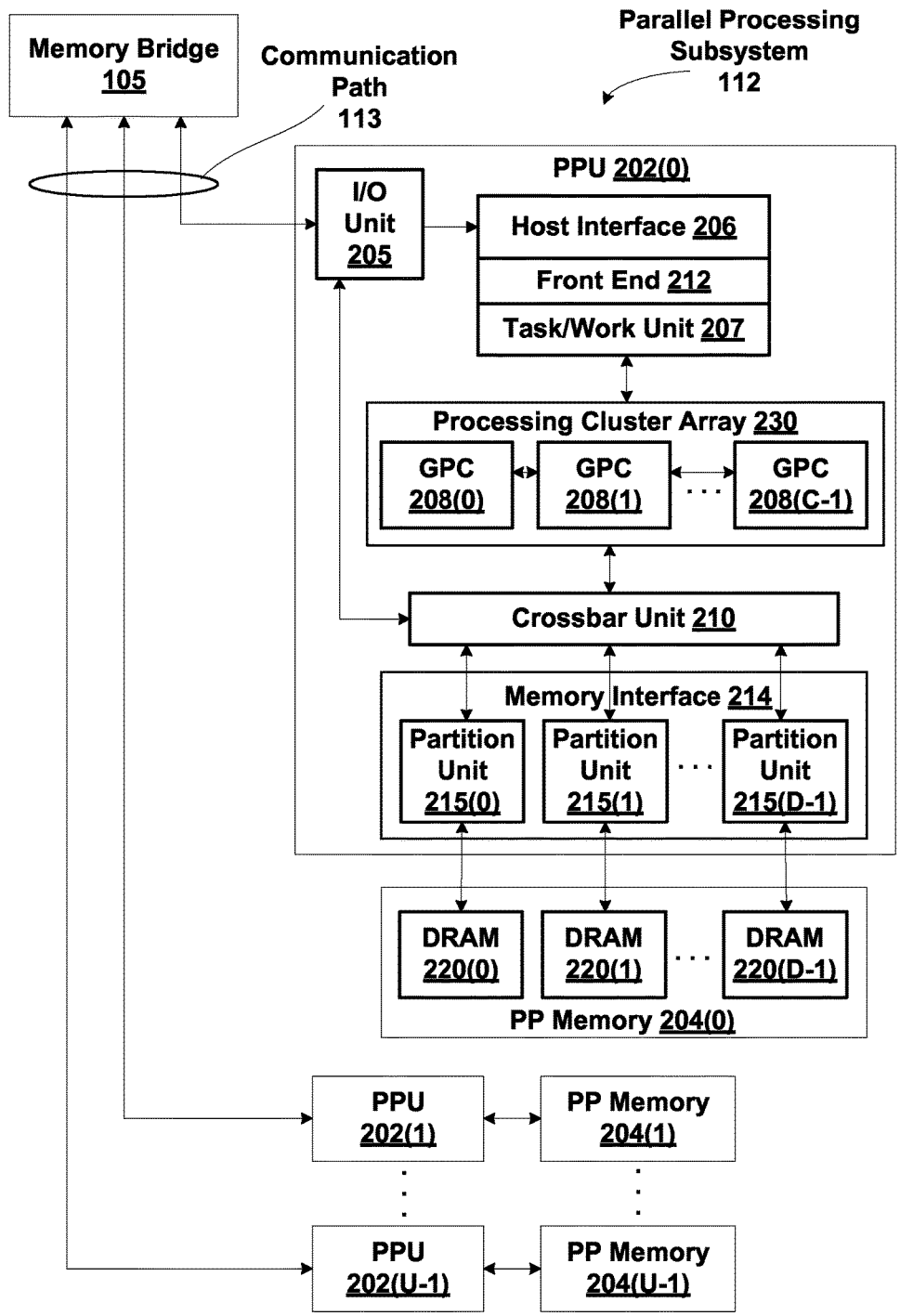
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing system 112 may output data to display device 110 or each PPU 202 in parallel processing system 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer by an application program via the device driver 103 to control scheduling of the different pushbuffers.

Referring back now to FIG. 2 as well as FIG. 1, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI Express link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3A:
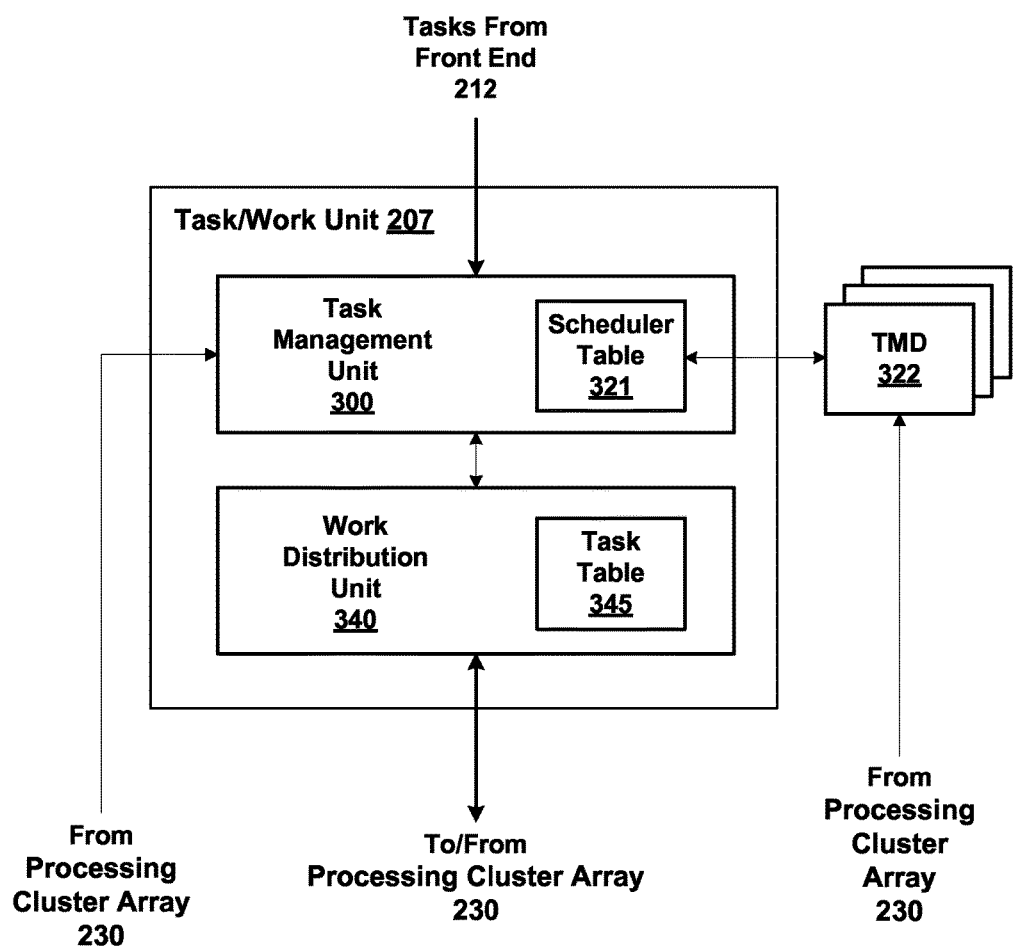
FIG. 3A is a block diagram of the front end of FIG. 2, according to one embodiment of the present invention.

FIG. 3A is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of pointers to the TMDs 322 corresponding to the tasks in the scheduler table 321, where the list may be implemented as a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution. Therefore, the task management unit 300 may collect several tasks based on priority information or using other techniques, such as round-robin scheduling.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution of the task is not complete, then a pointer to the task is added to a list of task pointers to be scheduled so that execution of the task will resume at a later time. When a child processing task is generated, during execution of a task, a pointer to the child task is added to a list of task pointers to be scheduled. A child task may be generated by a TMD 322 executing in the processing cluster array 230.

Unlike a task that is received by the task/work unit 207 from the front end 212, child tasks are received from the processing cluster array 230. Child tasks are not inserted into pushbuffers or transmitted to the front end. The CPU 102 is not notified when a child task is generated or data for the child task is stored in memory. Another difference between the tasks that are provided through pushbuffers and child tasks is that the tasks provided through the pushbuffers are defined by the application program whereas the child tasks are dynamically generated during execution of the tasks.

Task Processing Overview

Figure 3B:
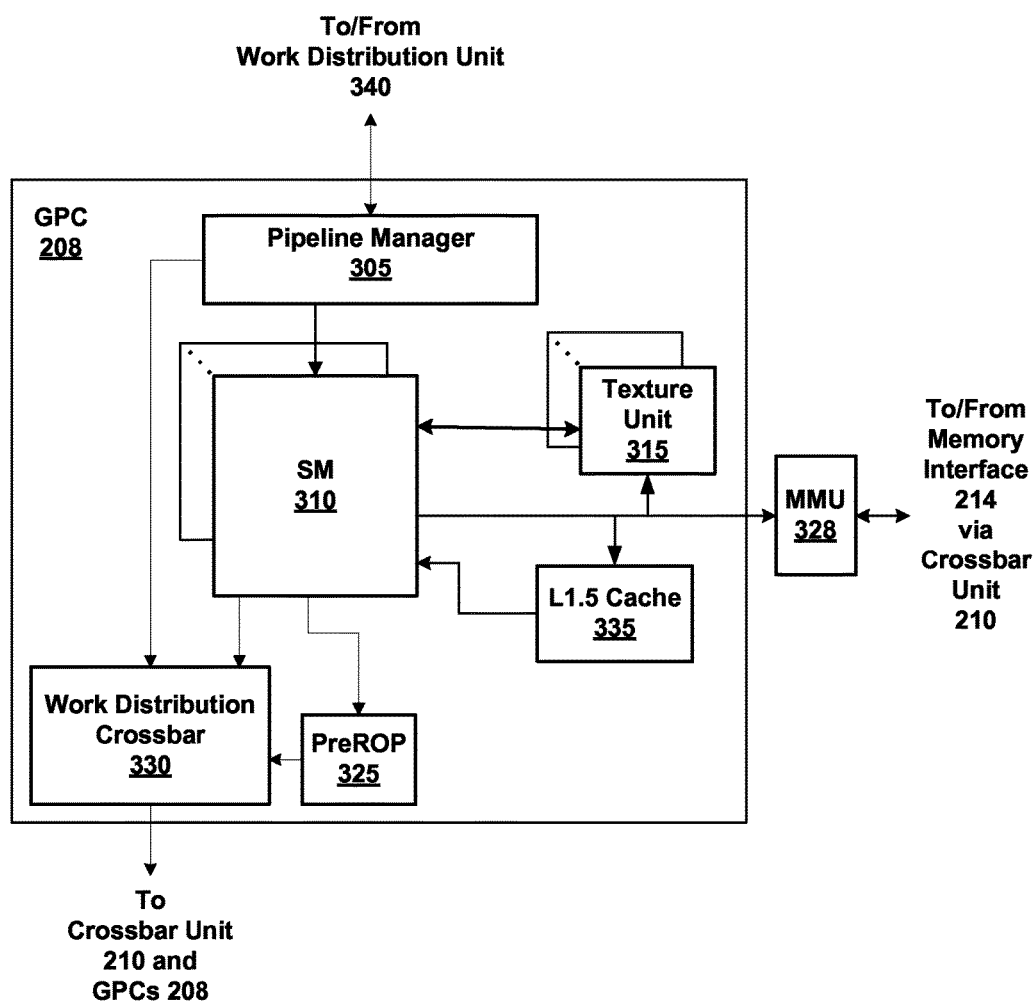
FIG. 3B is a block diagram of a general processing cluster within one of the parallel processing units of FIG. 2, according to one embodiment of the present invention.

FIG. 3B is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

Operation of GPC 208 is advantageously controlled via a pipeline manager 305 that distributes processing tasks to streaming multiprocessors (SMs) 310. Pipeline manager 305 may also be configured to control a work distribution crossbar 330 by specifying destinations for processed data output by SMs 310.

In one embodiment, each GPC 208 includes a number M of SMs 310, where M≥1, each SM 310 configured to process one or more thread groups. Also, each SM 310 advantageously includes an identical set of functional execution units (e.g., execution units and load-store units—shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SM 310 is referred to herein as a "warp" or "thread group." As used herein, a "thread group" refers to a group of threads concurrently executing the same program on different input data, with one thread of the group being assigned to a different processing engine within an SM 310. A thread group may include fewer threads than the number of processing engines within the SM 310, in which case some processing engines will be idle during cycles when that thread group is being processed. A thread group may also include more threads than the number of processing engines within the SM 310, in which case processing will take place over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SM 310, and m is the number of thread groups simultaneously active within the SM 310. The size of a CTA is generally determined by the programmer and the amount of hardware resources, such as memory or registers, available to the CTA.

Each SM 310 includes a level one (L1) cache (shown in FIG. 3C) or uses space in a corresponding L1 cache outside of the SM 310 that is used to perform load and store operations. Each SM 310 also has access to level two (L2) caches that are shared among all GPCs 208 and may be used to transfer data between threads. Finally, SMs 310 also have access to off-chip "global" memory, which can include, e.g., parallel processing memory 204 and/or system memory 104. It is to be understood that any memory external to PPU 202 may be used as global memory. Additionally, a level one-point-five (L1.5) cache 335 may be included within the GPC 208, configured to receive and hold data fetched from memory via memory interface 214 requested by SM 310, including instructions, uniform data, and constant data, and provide the requested data to SM 310. Embodiments having multiple SMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SM 310 or the L1 cache or GPC 208. The physical address is processed to distribute surface data access locality to allow efficient request interleaving among partition units 215. The cache line index may be used to determine whether or not a request for a cache line is a hit or miss.

In graphics and computing applications, a GPC 208 may be configured such that each SM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SM 310 and is fetched from an L2 cache, parallel processing memory 204, or system memory 104, as needed. Each SM 310 outputs processed tasks to work distribution crossbar 330 in order to provide the processed task to another GPC 208 for further processing or to store the processed task in an L2 cache that is shared between all GPCs 208, parallel processing memory 204, or system memory 104 via crossbar unit 210. A preROP (pre-raster operations) 325 is configured to receive data from SM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SMs 310 or texture units 315, preROPs 325 may be included within a GPC 208. Further, as shown in FIG. 2, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches to execute tasks for one or more application programs.

Persons of ordinary skill in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
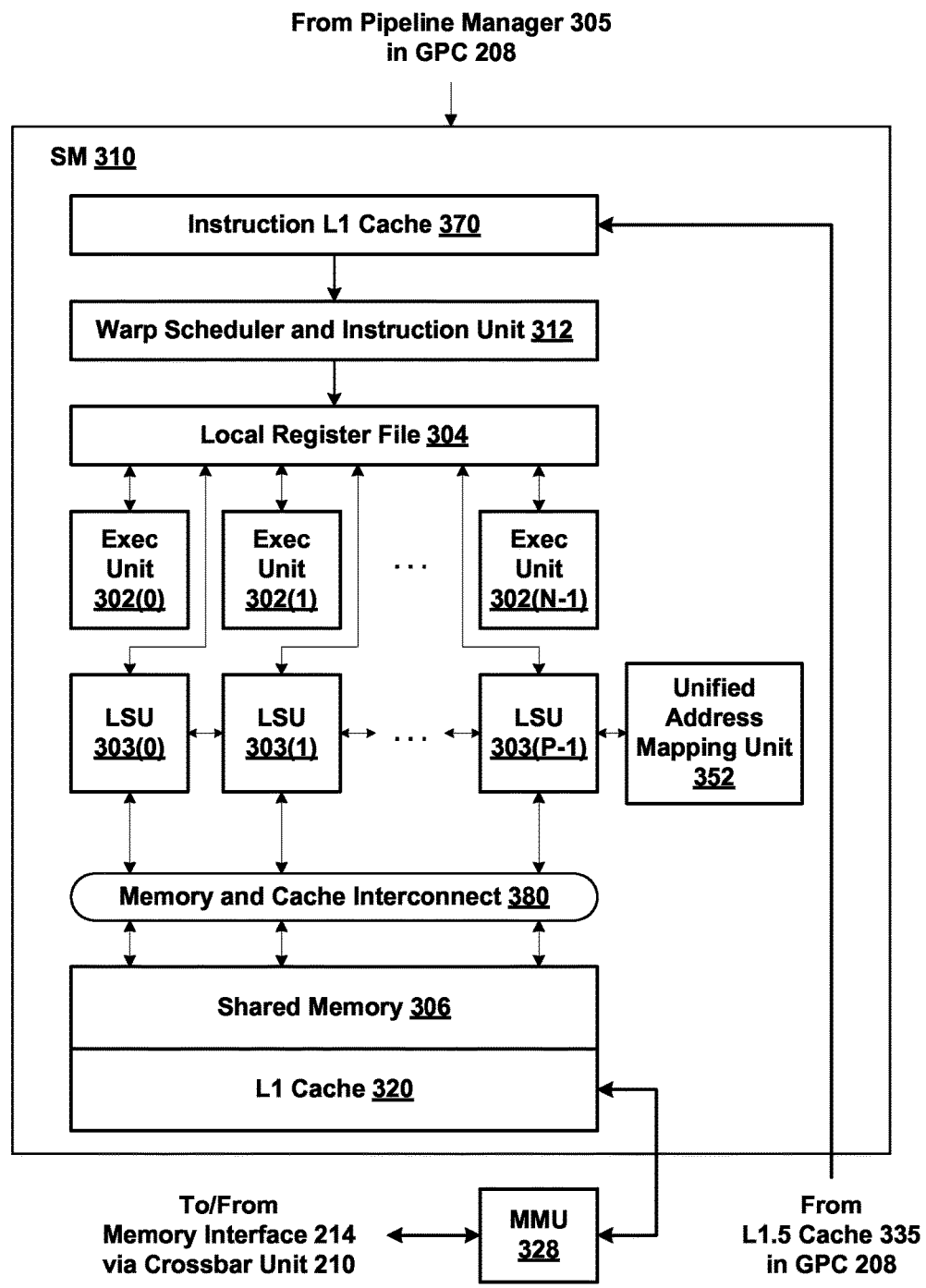
FIG. 3C is a block diagram of a portion of the streaming multiprocessor of FIG. 3B, according to one embodiment of the present invention.

FIG. 3C is a block diagram of the SM 310 of FIG. 3B, according to one embodiment of the present invention. The SM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SM 310 functional units according to the instructions and constants. The SM 310 functional units include N exec (execution or processing) units 302 and P load-store units (LSU) 303.

SM 310 provides on-chip (internal) data storage with different levels of accessibility. Special registers (not shown) are readable but not writeable by LSU 303 and are used to store parameters defining each thread's "position." In one embodiment, special registers include one register per thread (or per exec unit 302 within SM 310) that stores a thread ID; each thread ID register is accessible only by a respective one of the exec unit 302. Special registers may also include additional registers, readable by all threads that execute the same processing task represented by a TMD 322 (or by all LSUs 303) that store a CTA identifier, the CTA dimensions, the dimensions of a grid to which the CTA belongs (or queue position if the TMD 322 encodes a queue task instead of a grid task), and an identifier of the TMD 322 to which the CTA is assigned.

If the TMD 322 is a grid TMD, execution of the TMD 322 causes a fixed number of CTAs to be launched and executed to process the fixed amount of data stored in the queue 525. The number of CTAs is specified as the product of the grid width, height, and depth. The fixed amount of data may be stored in the TMD 322 or the TMD 322 may store a pointer to the data that will be processed by the CTAs. The TMD 322 also stores a starting address of the program that is executed by the CTAs.

If the TMD 322 is a queue TMD, then a queue feature of the TMD 322 is used, meaning that the amount of data to be processed is not necessarily fixed. Queue entries store data for processing by the CTAs assigned to the TMD 322. The queue entries may also represent a child task that is generated by another TMD 322 during execution of a thread, thereby providing nested parallelism. Typically, execution of the thread, or CTA that includes the thread, is suspended until execution of the child task completes. The queue may be stored in the TMD 322 or separately from the TMD 322, in which case the TMD 322 stores a queue pointer to the queue. Advantageously, data generated by the child task may be written to the queue while the TMD 322 representing the child task is executing. The queue may be implemented as a circular queue so that the total amount of data is not limited to the size of the queue.

CTAs that belong to a grid have implicit grid width, height, and depth parameters indicating the position of the respective CTA within the grid. Special registers are written during initialization in response to commands received via front end 212 from device driver 103 and do not change during execution of a processing task. The front end 212 schedules each processing task for execution. Each CTA is associated with a specific TMD 322 for concurrent execution of one or more tasks. Additionally, a single GPC 208 may execute multiple tasks concurrently.

A parameter memory (not shown) stores runtime parameters (constants) that can be read but not written by any thread within the same CTA (or any LSU 303). In one embodiment, device driver 103 provides parameters to the parameter memory before directing SM 310 to begin execution of a task that uses these parameters. Any thread within any CTA (or any exec unit 302 within SM 310) can access global memory through a memory interface 214. Portions of global memory may be stored in the L1 cache 320.

Local register file 304 is used by each thread as scratch space; each register is allocated for the exclusive use of one thread, and data in any of local register file 304 is accessible only to the thread to which the register is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers. Additionally, a uniform L1 cache 375 stores uniform or constant values for each lane of the N exec units 302 and P load-store units LSU 303.

Shared memory 306 is accessible to threads within a single CTA; in other words, any location in shared memory 306 is accessible to any thread within the same CTA (or to any processing engine within SM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and task ID, as well as CTA and grid dimensions or queue position, implementing portions of the special registers. Each LSU 303 in SM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 cache 320 in each SM 310 can be used to cache private per-thread local data and also per-application global data. In some embodiments, the per-CTA shared data may be cached in the L1 cache 320. The LSUs 303 are coupled to the shared memory 306 and the L1 cache 320 via a memory and cache interconnect 380.

Operand Collection in a Register File

As illustrated in FIGS. 4A-4D, register files 402 include registers that store data, such as instruction operands, accessed by the processor when executing instructions. Each individual register cell is identified by a thread address and a register address. For example, the register in the upper-left corner of register file 0 402(0) is register 10 of thread 4, so identified by the nomenclature T4:10. Similarly, the register in the lower-right corner of register file 0 402(0) is register 0 of thread 3, so identified by the nomenclature T3:0. Each register file is organized such that one row of registers in each register file may be accessed simultaneously during a given register access operation. For example, registers T0:0, T1:0, T2:0, and T3:0 may be accessed simultaneously in a single register access operation. Register files 402 are organized into logical banks according to the type of operands accessed during a specific register access operation. When operands are read from the register files, the register access operations form patterns across the register files, identified herein as "shaped accesses." The placement of registers within the register files and the shaped access patterns formed during register access operations take advantage of common operand configurations. As a result, use of shaped accesses, as opposed to separate serial register access operations for each operand, decreases the latency for collecting instruction operands from the register files, thereby improving performance. Each of FIGS. 4A-4D illustrates a different exemplary shaped access pattern.

Figure 4A:
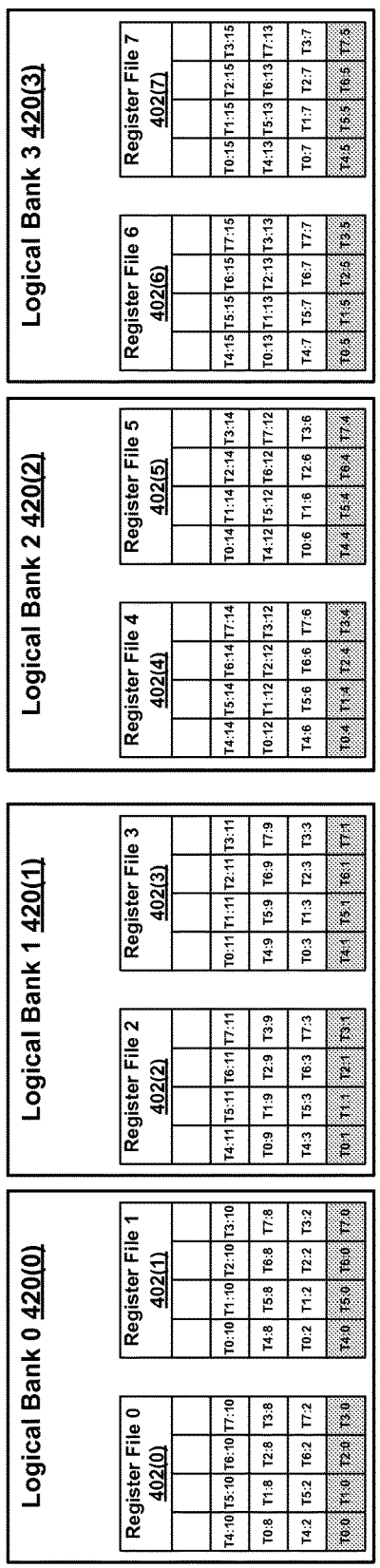
FIG. 4A illustrates a bank of register files configured for operand collection, according to one embodiment of the present invention.

FIG. 4A illustrates a bank of register files configured for operand collection, according to one embodiment of the present invention. As shown, the bank of register files includes register files 402 and logical banks 420. In this case, logical banks 420 may be formed such that logical bank 0 420(0) includes register file 0 402(0) and register file 2 402(1), logical bank 1 420(1) includes register file 1 402(2) and register file 3 402(3), and so on. With this arrangement, the register files 402 are optimized to retrieve single-width operands. For example, if threads 0 through 7 all access a single-width operand stored in register 0, then the processor may form a shaped access within logical bank 0 420(0) to retrieve the bottom row of registers, including T0:0 through T7:0. The processor may form a shaped access within logical bank 1 420(1) to retrieve a different single-width operand for a same group of threads, such as T0:1 through T7:1. Similarly, the processor may form a shaped access within logical bank 2 420(2) and logical bank 3 420(3) to retrieve a single-width operand at registers 4 and 5 for the same set of eight threads. During a single register access operation, the illustrated shaped access retrieves four single-width operands for each of eight threads, as illustrated by the shaded region in FIG. 4A.

Figure 4B:
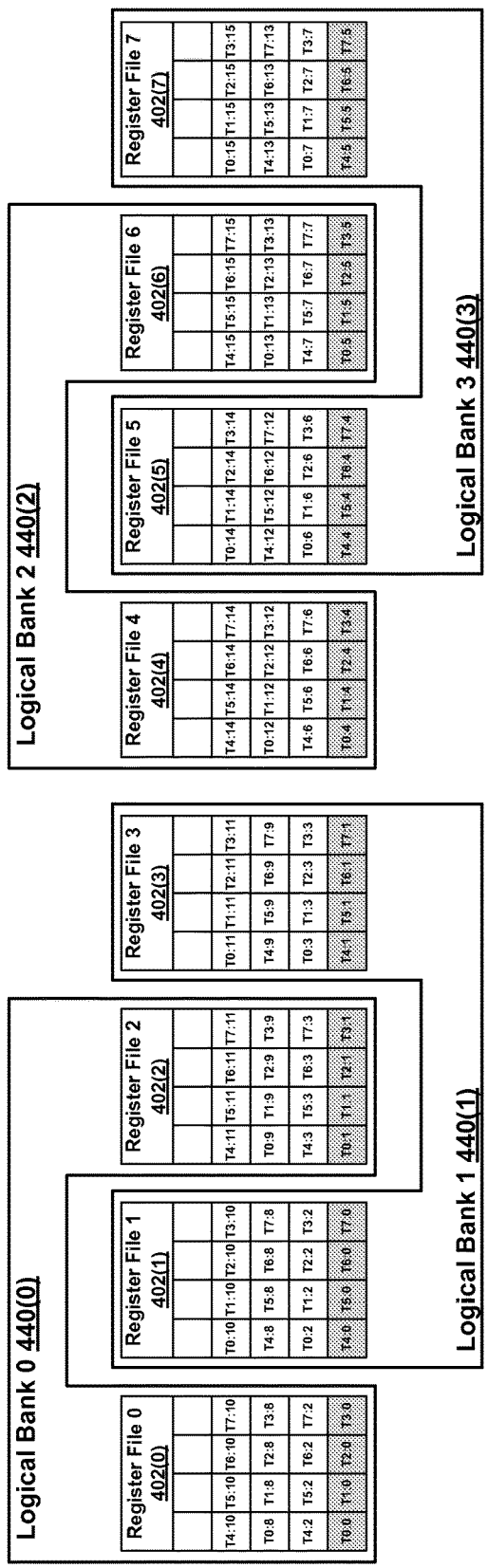
FIG. 4B illustrates a bank of register files configured for operand collection, according to an alternative embodiment of the present invention.

FIG. 4B illustrates a bank of register files configured for operand collection, according to an alternative embodiment of the present invention. As shown, the bank of register files includes the register files 402 and logical banks 440. In this case, logical banks 440 may be formed such that logical bank 0 440(0) includes register file 0 402(0) and register file 2 402(2), logical bank 1 440(1) includes register file 1 402(1) and register file 3 402(3), and so on. With this arrangement, the register files 402 are optimized to retrieve double-width operands. For example, if threads 0 through 3 all access a double-width operand stored in register pair 0-1, then the processor may form a shaped access within logical bank 0 440(0) to retrieve the bottom row of registers, including T0:0-1 through T3:0-1. The processor may form a shaped access within logical bank 1 440(1) to retrieve a double-width operand for a different group of threads, such as T4:0-1 through T7:0-1. Similarly, the processor may form a shaped access within logical bank 2 440(2) and logical bank 3 440(3) to retrieve a double-width operand for four threads from each logical bank. For example, during a single register access operation, the illustrated shaped access retrieves two double-width operands for each of eight threads as illustrated by the shaded region in FIG. 4B.

Figure 4C:
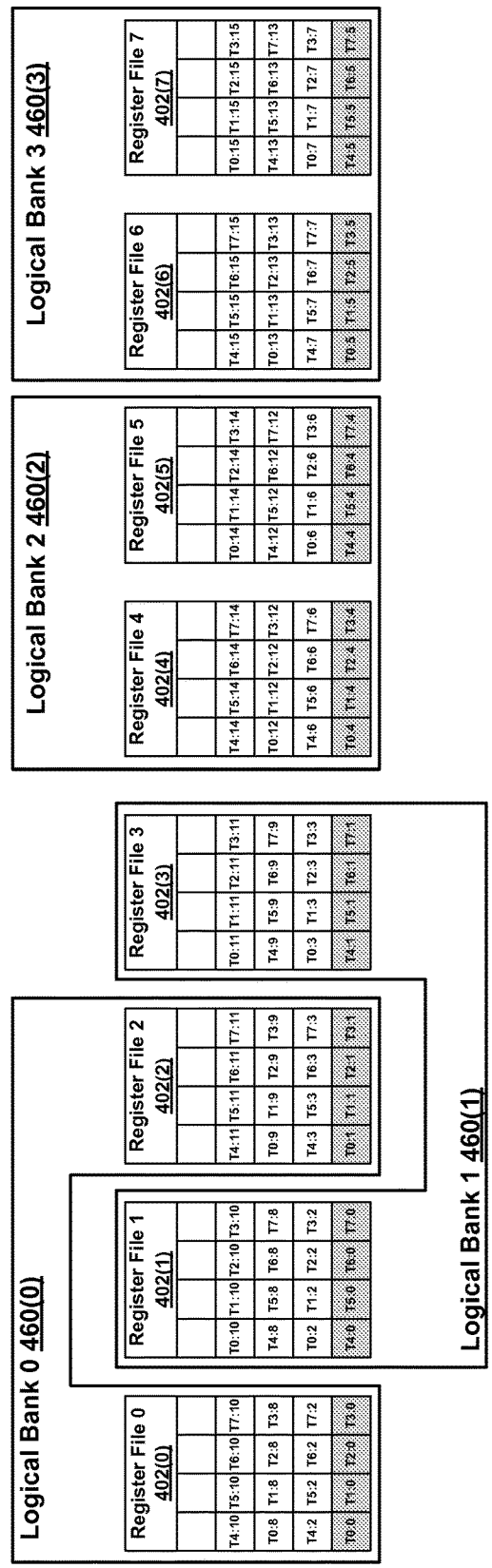
FIG. 4C illustrates a bank of register files configured for operand collection, according to another alternative embodiment of the present invention.

FIG. 4C illustrates a bank of register files configured for operand collection, according to another alternative embodiment of the present invention. As shown, the bank of register files includes the register files 402 and logical banks 460. In this case, logical banks 460 may be formed such that two logical banks 460(2) 460(3) are optimized to retrieve single-width operands, and two logical banks 460(0) 460(1) are optimized to retrieve double-width operands. For example, during a single register access operation, the illustrated shaped access retrieves one double-width operand for each of eight threads from logical bank 0 460(0) and logical bank 1 460(1), namely registers T0:0-1 through T7:0-1. During the same register access operation, the illustrated shaped access retrieves two single-width operands for each of eight threads from logical bank 2 460(2) and logical bank 3 460(3), namely registers 4 and 5 for threads 0-7. This exemplary shaped access is illustrated by the shaded region in FIG. 4C.

Figure 4D:
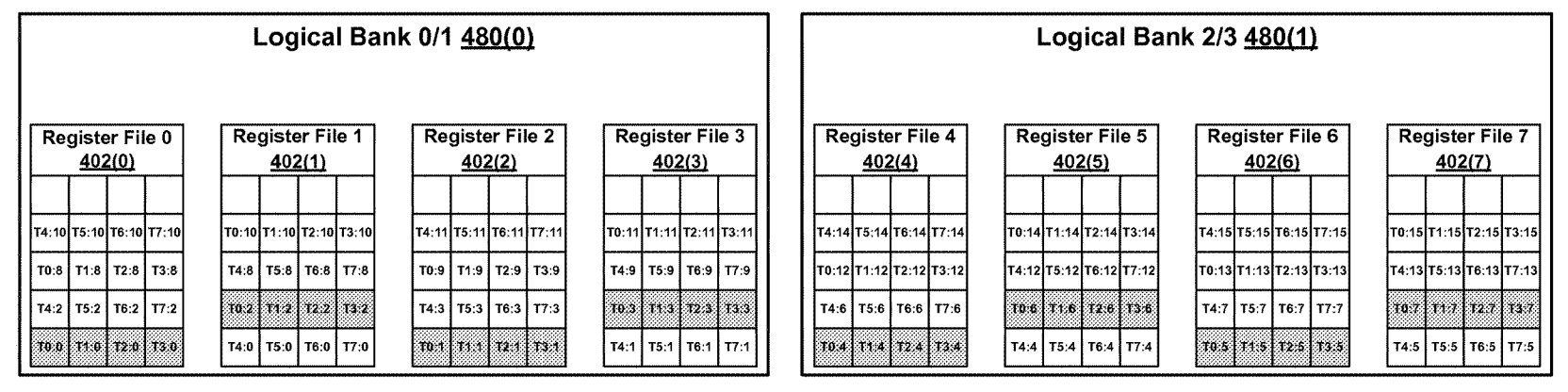

FIG. 4D illustrates a bank of register files configured for operand collection, according to yet another alternative embodiment of the present invention. As shown, the bank of register files includes the register files 402 and logical banks 480. In this case, logical banks 480 may be formed such that the logical banks 480 are optimized to retrieve quadruple-width operands. For example, during a single register access operation, the illustrated shaped access retrieves one quadruple-width operand for each of four threads from logical bank 0/1 480(0), namely registers T0:0-3 through T3:0-3. During the same register access operation, the illustrated shaped access retrieves a second quadruple-width operand for the same four threads from logical bank 2/3 480(1), namely registers T0:4-7 through T3:4-7. This exemplary shaped access is illustrated by the shaded region in FIG. 4D.

Figure 5:
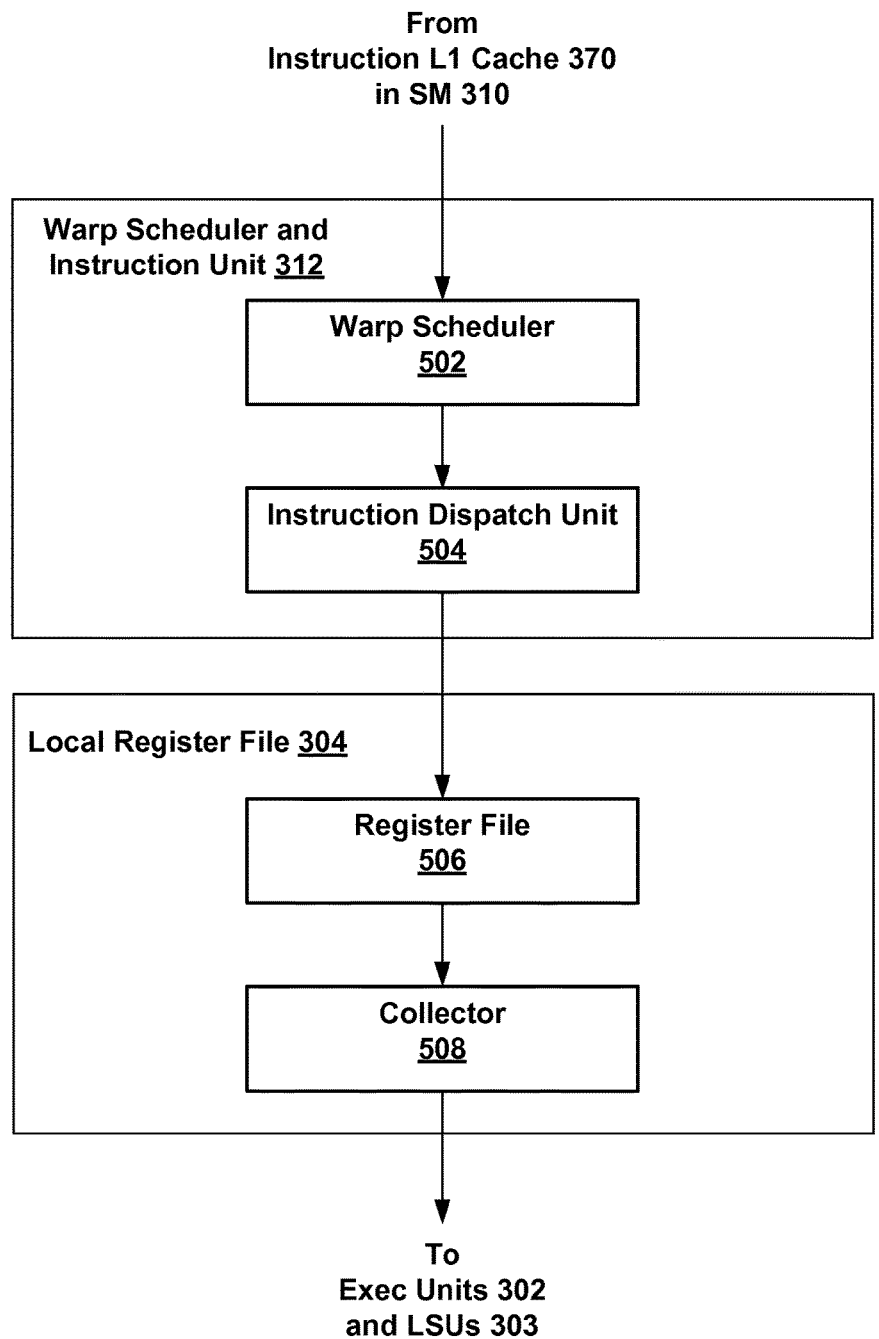
FIG. 5 illustrates a block diagram of the warp scheduler and instruction unit and the local register file of FIG. 3C, according to one embodiment of the present invention.

FIG. 5 illustrates a block diagram of the warp scheduler and instruction unit 312 and the local register file 304 of FIG. 3C, according to one embodiment of the present invention. As shown, the warp scheduler and instruction unit 312 includes a warp scheduler 502 and an instruction dispatch unit 504. The warp scheduler 502 receives instructions and constants from the instruction L1 cache 370, and schedules the instruction to execute as one more threads within a thread group. The instruction dispatch unit 504 controls the local register file 304 and SM 310 functional units according to the instructions and constants retrieved from the instruction L1 cache 370. The instruction dispatch unit 504 evaluates the instruction operands to determine whether the operands fit within a recognized shaped access pattern. The instruction dispatch unit 504 then selects a shaped access to read a set of operands from the register file 506. The instruction dispatch unit 504 then generates the addresses and read enables to read the operands from the register file 506.

The local register file 304 includes a register file 506 and a collector 508. The register file 506, retrieves the operands during the register access operation according to the pattern of the shaped access, and sends the operands to the collector 508. The collector 508 aligns the operands according the position of the operands in the original instructions and stores the operands accordingly. If all operands are retrieved during the first register access operation, then the instructions and operands are passed to the SM 310 functional units, including the exec units 302 and load-store units 303. If some operands are not retrieved during the first register access operation, then the collector 508 stores the result of each shaped access until all operands are collected. Once all operands are stored within the collector 508, the instructions and operands are passed to the SM 310 functional units, including the exec units 302 and load-store units 303.

In order to form a shaped access, the instruction dispatch unit 504 receives one or more instructions from the warp scheduler 502. Each instruction is associated with one or more operands. Collectively, the operands are organized into one or more operand groups from which a shaped access may be formed. The instruction dispatch unit 504 is configured to recognize the different memory access patterns typically utilized by the one or more operand groups. The instruction dispatch unit 504 forms shaped accesses to efficiently retrieve operand groups presenting one or more of these memory access patterns. In one embodiment, the instruction dispatch unit 504 separates the bank of register files into two sections, register files 0-3 402(0)-402(3) and register files 4-7 402(4)-402(7). For each of these two register file sections, the instruction dispatch unit 504 creates one or more shaped accesses. The instruction dispatch unit 504 identifies the location of each operand within the bank of register files. The instruction dispatch unit 504 records the specific threads requiring the operand, the register file that holds the operand for each of these threads, and the row within the register file where the operand is located. Next, the instruction dispatch unit 504 selects one of the operands and determines whether the operand is a single-width, double-width, or quadruple-width operand. The instruction dispatch unit 504 forms logical banks within the section of register files according to the operand width. The instruction dispatch unit 504 then forms a shaped access across the logical bank where the selected operand is stored, typically configured to read the same row address across the logical bank. Similarly, an operand is selected for the other logical bank within the section of register files, and a shaped access is formed for that logical bank too. The process is then repeated for the other section of register files. Because the two sections of register files are handled separately, the arrangement of logical banks and the shaped access types may be different in each of the two sections of register files.

Once the shaped accesses are properly identified and configured, the instruction dispatch unit 504 enables the register file 506 to read the registers associated with the shaped accesses, as described above. The instruction dispatch unit 504 aligns the retrieved operands with the corresponding instructions and transmits the aligned operands to the collector 508 where the operands are stored. Next, the instruction dispatch unit 504 determines whether all operands associated with the current set of instructions have been read and collected from the register file 506 and stored in the collector 508. If additional operands are to be read, then the instruction dispatch unit 504 stalls the pipeline within the SM 310 and repeats the process described above to form additional shaped accesses for the remaining operands. The process continues until all operands associated with the current set of instructions are read and collected, at which time the instruction dispatch unit 504 unstalls the pipeline within the SM 310, thereby enabling the instructions to be executed.

An example of the foregoing process is as follows. Suppose that the instruction dispatch unit 504 could select a double-width operand for thread 0 located at registers 0-1 within the first section of register files. The operand could be located in the lower-left cells of register file 0 402(0) and register file 2 402(2) as shown in FIG. 4C. As a result, the instruction dispatch unit 504 would form logical bank 0 460(0) configured to include register file 0 402(0) and register file 2 402(2). Similarly, the instruction dispatch unit 504 would form logical bank 1 460(1) configured to include register file 1 402(1) and register file 3 402(3). The resulting shaped access would access two sets of double-width operands for each of four threads. Likewise, the instruction dispatch unit 504 could select a single-width operand for thread 0 located at register 4 within the second section of register files. The operand could be located in the lower-left cell of register file 4 402(4) as shown in FIG. 4C. As a result, the instruction dispatch unit 504 would form logical bank 2 460(2) configured to include register file 4 402(4) and register file 5 402(5). Similarly, the instruction dispatch unit 504 would form logical bank 3 460(3) configured to include register file 6 402(6) and register file 7 402(7). The resulting shaped access would access two sets of single-width operands for each of eight threads. Once the shaped accesses are completed, the instruction dispatch unit 504 would determine whether additional operands remain. If more operands are to be collected, the instruction dispatch unit 504 would stall the SM 310 pipeline, form additional shaped accesses to collect any remaining operands, and then unstall the SM 310 pipeline.

Figure 6:
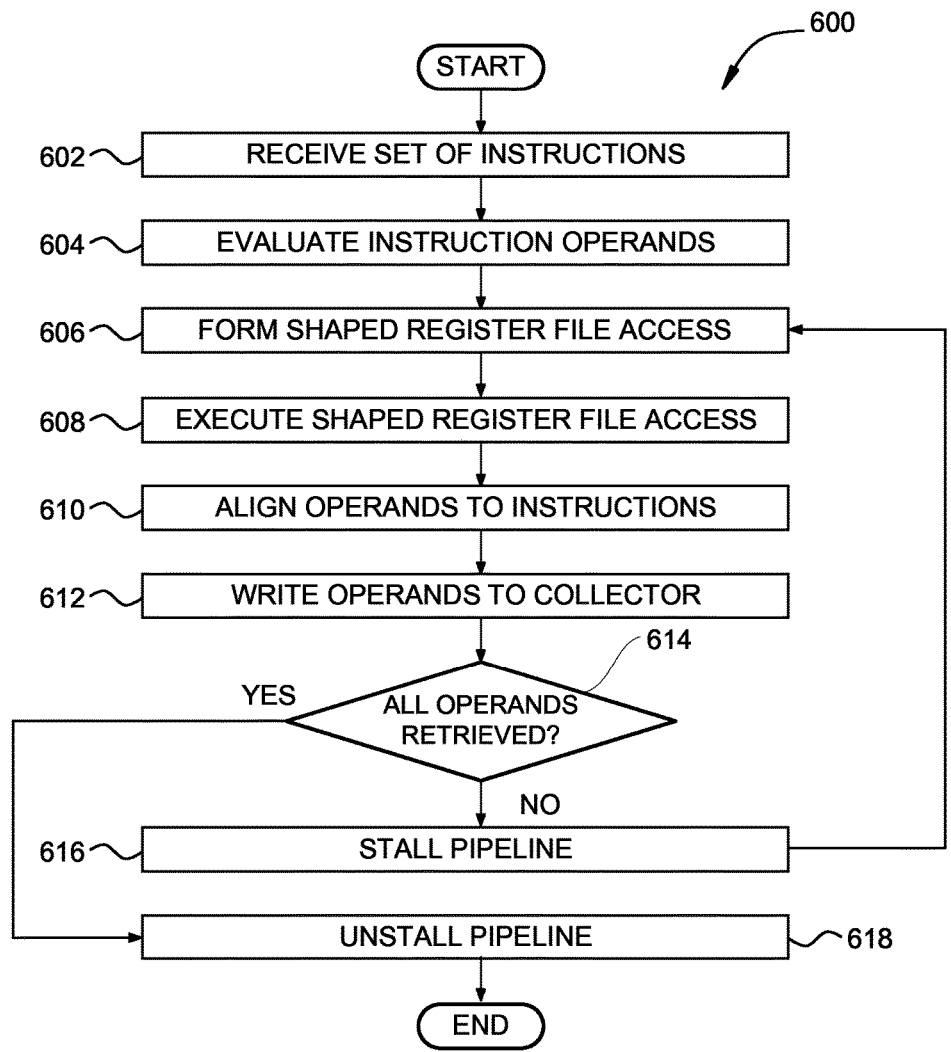
FIG. 6 is a flow diagram of method steps for collecting register file operands, according to one embodiment of the present invention.

FIG. 6 is a flow diagram of method steps for collecting register file operands, according to one embodiment of the present invention. Although the method steps are described in conjunction with the systems of FIGS. 1-5, persons of ordinary skill in the art will understand that any system configured to perform the method steps, in any order, is within the scope of the present invention.

As shown, the method 600 begins at step 602, where the instruction dispatch unit 504 receives a set of one or more instructions from the warp scheduler 502. Each instructions may include one or more operands and be scheduled to execute on one or more threads. At step 604, the instruction dispatch unit 504 evaluates the set of operands accessed by the one or more instructions in order to determine whether the operands fit into one of several recognized shaped access patterns. To the extent a shaped access pattern is recognized, the instruction dispatch unit 504, at step 606, forms a shaped register file access to retrieve the instruction operands. At step 608, the instruction dispatch unit 504 executes the shaped register file access by sending the corresponding register addresses and read enables to the register file 506. At step 610, the instruction dispatch unit 504 aligns the retrieved operands with the corresponding instructions. At step 612, the instruction dispatch unit 504 writes the retrieved operands to the collector 508.

At step 614, the instruction dispatch unit 504 determines whether all operands have been retrieved. If all operands have not been retrieved, then the method 600 continues to step 616, where the instruction dispatch unit 504 stalls the pipeline to prevent further instructions from entering the warp scheduler and instruction unit 312. The method 600 then returns to step 606, where the instruction dispatch unit 504 forms another shaped register access. The method 600 continues until the instruction dispatch unit 504 determines, at step 614, that all operands have been retrieved. The method 600 then proceeds to step 618, where the instruction dispatch unit 504 unstalls the pipeline, at which point the method 600 terminates.

In sum, the disclosed technique provides an efficient way to retrieve operands from a register file. Specifically, the instruction dispatch unit 504 receives one or more instructions from the warp scheduler 502, each of which includes one or more operands, to be executed across one or more threads. Collectively, the operands are organized into one or more operand groups from which a "shaped access" may be formed. The instruction dispatch unit 504 is configured to recognize different memory access patterns utilized by the operand groups. The instruction dispatch unit 504 forms a shaped access corresponding to the memory access patterns. The operands corresponding to registers covered by the shaped access are retrieved from the register file 506 and stored in a collector 508. If all instruction operands are not read and collected in the collector 508 after the shaped access, then the instruction dispatch unit 504 stalls the pipeline within the SM 310 and forms another shaped access to retrieve the additional operands from the register file 506 and store the operands in the collector 508. Once all operands are read and collected in the collector 508, the instruction dispatch unit 504 unstalls the pipeline and transmits the instructions and corresponding operands to functional units within the SM 310 for execution.

Advantageously, multiple operands are retrieved from the register file 506 in a single register access operation without resource conflict. Where instruction operands utilize recognized memory access patterns, performance in retrieving operands from the register file 506 is improved by forming shaped accesses that efficiently retrieve operands exhibiting these access patterns. Further, the register files 402 within the bank of register files may be flexibly arranged into logical banks to retrieve multiple operands within a set of instructions. Thus, each register access operation may have a different shaped access utilizing a different logical bank arrangement as warranted by the set of operands. The instruction dispatch unit 504 performs one or more register access operations using shaped accesses until all operands are read and collected.

While the foregoing is directed to embodiments of the present invention, other and further embodiments of the invention may be devised without departing from the basic scope thereof, and the scope thereof is determined by the claims that follow.

What is claimed is:

1. A computer-implemented method for performing register memory operations, the method comprising:
receiving an instruction that is to be executed across a plurality of operands;

organizing the plurality of operands into one or more operand groups based on a location of each operand within a bank of register files;

determining that a plurality of register files in which a first operand group is stored is accessible via a particular memory access pattern, wherein the plurality of register files is included in the bank of register files, and the first operand group is included in the one or more operand groups;

forming a shaped memory access operation corresponding to the particular memory access pattern; and performing the shaped memory access operation to access the plurality of operands from the plurality of register files.

2. The method of claim 1, wherein the shaped memory access operation is configured to access single-width operands.

3. A subsystem for performing register memory operations, comprising:

an instruction dispatch unit configured to:

receive an instruction that is to be executed across a plurality of operands;

organize the plurality of operands into one or more operand groups based on a location of each operand within a bank of register files;

determine that a plurality of register files in which a first operand group is stored is accessible via a particular memory access pattern, wherein the plurality of register files is included in the bank of register files, and the first operand group is included in the one or more operand groups;

form a shaped memory access operation corresponding to the particular memory access pattern; and perform the shaped memory access operation to access the plurality of operands from the plurality of register files.

4. The subsystem of claim 3, wherein the shaped memory access operation is configured to access single-width operands.

5. A computing device comprising:

a subsystem that includes an instruction dispatch unit configured to:

receive an instruction that is to be executed across a plurality of operands;

organize the plurality of operands into one or more operand groups based on a location of each operand within a bank of register files;

determine that a plurality of register files in which a first operand group is stored is accessible via a particular memory access pattern, wherein the plurality of register files is included in the bank of register files, and the first operand group is included in the one or more operand groups;

form a shaped memory access operation corresponding to the particular memory access pattern; and perform the shaped memory access operation to access the plurality of operands from the plurality of register files.

6. The method of claim 1, wherein the plurality of register files is organized into two or more logical banks based on the types of operands associated with the plurality of operands.

7. The method of claim 1, wherein each register file included in the plurality of register files comprises a different plurality of registers, and each register included in the plurality of registers is identified with a thread identifier and a register identifier.

* * * * *